(12) United States Patent
Nogawa

(10) Patent No.: US 11,880,614 B2
(45) Date of Patent: Jan. 23, 2024

(54) INFORMATION PROCESSING APPARATUS, PRODUCTIVITY MANAGEMENT METHOD, AND PROGRAM

(71) Applicant: Konica Minolta, Inc., Tokyo (JP)

(72) Inventor: Tetsuren Nogawa, Hachioji (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 17/592,936

(22) Filed: Feb. 4, 2022

(65) Prior Publication Data

US 2022/0253258 A1 Aug. 11, 2022

(30) Foreign Application Priority Data

Feb. 9, 2021 (JP) ................................ 2021-018714

(51) Int. Cl.
*G06F 3/12* (2006.01)
(52) U.S. Cl.
CPC .......... *G06F 3/1211* (2013.01); *G06F 3/1273* (2013.01)
(58) Field of Classification Search
CPC .... G06F 3/1211; G06F 3/1273; G06F 3/1275; G06F 3/1208

USPC ................ 358/1.15, 3.24, 504; 399/8, 9, 10
See application file for complete search history.

(56) References Cited

U.S. PATENT DOCUMENTS

2006/0247938 A1* 11/2006 Thieret .................. G06Q 99/00
705/7.36
2017/0371600 A1* 12/2017 Tanaka ................. A61B 5/0022

FOREIGN PATENT DOCUMENTS

JP 2009-211256 A 9/2009

* cited by examiner

*Primary Examiner* — Jamares Q Washington
(74) *Attorney, Agent, or Firm* — RANKIN, HILL & CLARK LLP

(57) ABSTRACT

An information processing apparatus manages productivity by processing information obtained from one or more image forming apparatuses, and includes: a hardware processor that: acquires operation history information from the image forming apparatus; analyzes the operation history information and determines an improvement measure for improving the productivity based on an analysis result; and outputs the improvement measure.

15 Claims, 15 Drawing Sheets

FIG. 10

ANALYSIS RESULT: OCT. 4 (SUN.) TO OCT 10 (SAT.) — 1010

| SUGGESTION | SUGGESTION TYPE | ANALYSIS CLASSIFICATION | EXPECTED EFFECT | SUGGESTION OUTLINE |
|---|---|---|---|---|
| | | | — | [41ST WEEK] PRINTING INTERRUPTION TIME HAS DECREASED BY 16.4 HOURS AS COMPARED WITH PRINTING INTERRUPTION TIME OF WEEK BEFORE LAST (40TH WEEK). PLEASE STABILIZE PRODUCTION IN THIS STATE |

ANALYSIS RESULT: SEP. 27 (SUN.) TO OCT 3 (SAT.) — 1020

| SUGGESTION | SUGGESTION TYPE | ANALYSIS CLASSIFICATION | EXPECTED EFFECT | SUGGESTION OUTLINE |
|---|---|---|---|---|
| | | | 94 MINUTES/WEEK | [40TH WEEK] BY IMPROVING PRINTING INTERRUPTION TIME DUE TO PAPER SHORTAGE IN MACHINE A AND MACHINE B, IT IS POSSIBLE TO OBTAIN IMPROVEMENT EFFECT OF ABOUT 94 MINUTES/WEEK — 1021 |
| | | | 43 MINUTES/WEEK | [40TH WEEK] BY IMPROVING FULL PAPER DISCHARGE TRAY, PRINTING INTERRUPTION TIME OF MACHINE C CAN BE DECREASED BY ABOUT 43 MINUTES/WEEK — 1022 |
| | | | 33 MINUTES/WEEK | [40TH WEEK] BY SETTING NUMBER OF SHEETS PER JOB TO ABOUT 500 SHEETS OR LESS, PRINTING INTERRUPTION TIME OF MACHINE D CAN BE DECREASED BY ABOUT 33 MINUTES/WEEK — 1023 |

| | | |
|---|---|---|
| 1101 | 💡 | : SUGGESTION (REPORT) FOR IMPROVEMENT ACTION |
| 1102 | 🔍 | : SUGGESTION (REPORT) FOR ANALYSIS AND DISCOVERY |
| 1103 | 👤 | : SUGGESTION (REPORT) RELATED TO OPERATION |
| 1104 | 🖨 | : SUGGESTION (REPORT) RELATED TO MACHINE |
| 1105 | 📦 | : SUGGESTION (REPORT) RELATED TO MATERIAL |
| 1106 | ↻ | : SUGGESTION (REPORT) RELATED TO METHOD AND PROCESS |
| 1107 | ⧖ | : SUGGESTION (REPORT) RELATED TO PRINTING INTERRUPTION TIME |
| 1108 | ⧖ | : SUGGESTION (REPORT) RELATED TO OPERATION TIME |
| 1109 | ⧖ | : SUGGESTION (REPORT) RELATED TO PRINTING PREPARATION TIME |

FIG. 12

DETAILS OF ANALYSIS AND IMPROVEMENT RECOMMENDATION — 1200, 1021

| SUGGESTION | SUGGESTION TYPE | ANALYSIS CLASSIFICATION | EXPECTED EFFECT | SUGGESTION OUTLINE |
|---|---|---|---|---|
| ☀ | 🔍🖨 | 🖨 | 94 MINUTES/WEEK | [40TH WEEK] BY IMPROVING PRINTING INTERRUPTION TIME DUE TO PAPER SHORTAGE IN MACHINE A AND MACHINE B, IT IS POSSIBLE TO OBTAIN IMPROVEMENT EFFECT OF ABOUT 94 MINUTES/WEEK |

1210 — ANALYSIS CLASSIFICATION: PRINTING INTERRUPTION TIME — 1212

1211 — 33.7% MACHINE OPERATION RATE

PRODUCTION RESULT BY TIME CLASSIFICATION (ENTIRE FACTORY)
- ☐ PRINTING TIME
- ▨ IDLE TIME
- ▦ PRINTING PREPARATION TIME
- ▪ PRINTING INTERRUPTION TIME (bar chart: 104.6, 164.1, 12.7, 28.6; TIME (h) axis 0–350) — 1213

TARGET APPARATUS:
- MACHINE A
- MACHINE B
- MACHINE C
- MACHINE D

INCREASE AND DECREASE IN PRODUCTION EFFICIENCY
33.7% LAST WEEK
OPERATION RATE OF WEEK BEFORE LAST 15%
OPERATION RATE = ACTUAL PRINTING TIME / POWER-ON TIME — 1214, 1240

1220 — ANALYSIS RESULT: IMPROVEMENT EFFECT OF 94 MINUTES IS EXPECTED (PER WEEK) — 1220a

1221 — PAPER SHORTAGE HAS STOPPED OPERATION FOR ESPECIALLY LONG TIME OF 1466 MINUTES AMONG INTERRUPTION FACTORS (TONER SHORTAGE, PAPER SHORTAGE, FULL PAPER DISCHARGE TRAY, AND OTHERS)

| PERIOD | | TONER SHORTAGE | PAPER SHORTAGE | FULL PAPER DISCHARGE TRAY | OTHERS |
|---|---|---|---|---|---|
| 20200920–20200926 | WEEK BEFORE LAST (39TH WEEK) | 251 | 721 | 0 | 271 |
| 20200927–20201003 | LAST WEEK (40TH WEEK) | 172 | 746 | 57 | 741 |
| TOTAL | | 423 | 1466 | 57 | 1012 |

1222 — BY IMPROVING PAPER SHORTAGE IN MACHINE A AND MACHINE B WHICH HAVE PARTICULARLY LONG PRINTING INTERRUPTION TIME, IT IS POSSIBLE TO DECREASE TIME BY 94 MINUTES/WEEK

1231, 1104, 1230

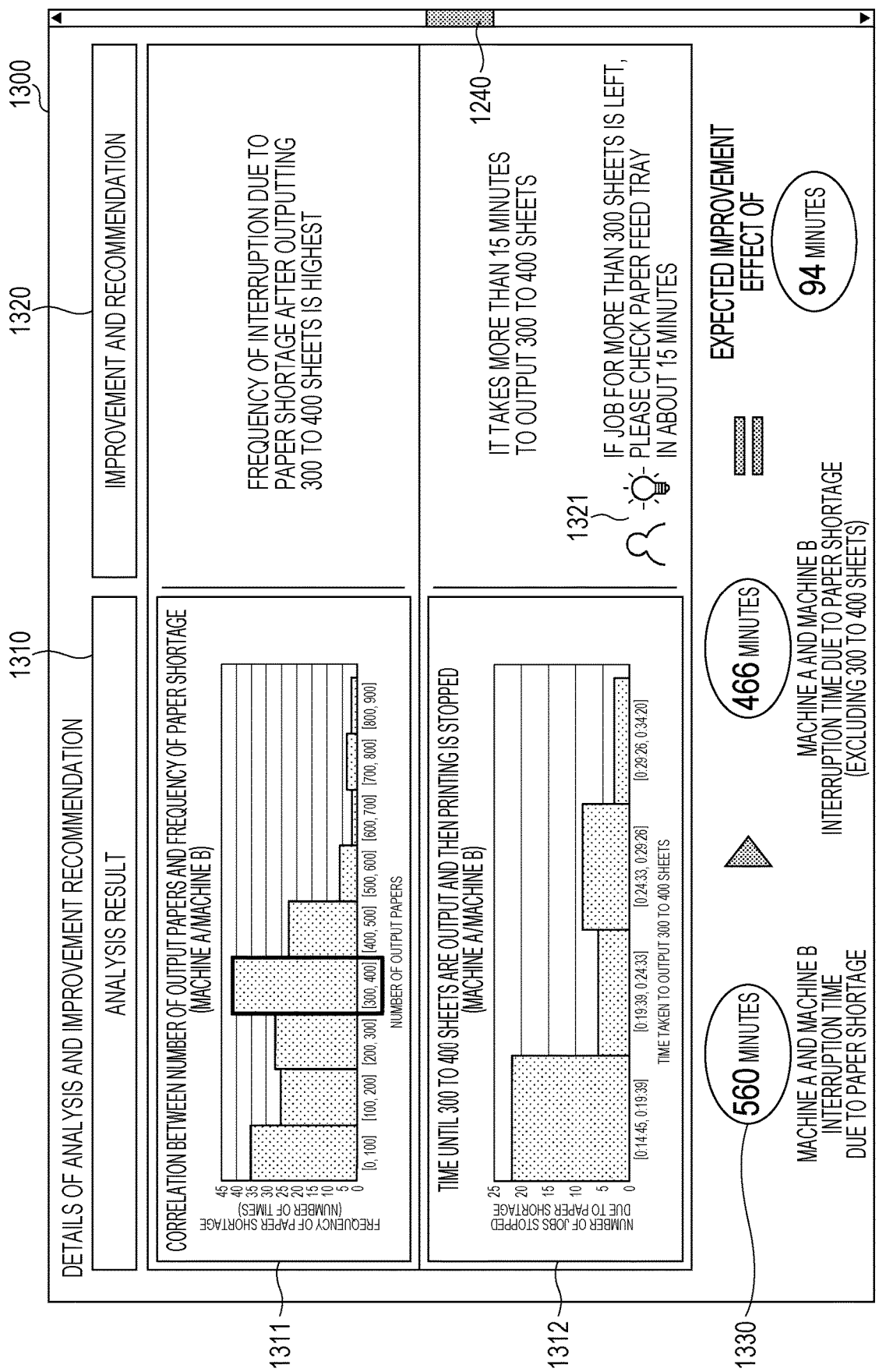

FIG. 16

| ANALYSIS RESULT OF LAST WEEK Best 4 | | | | |
|---|---|---|---|---|
| SUGGESTION | SUGGESTION TYPE | ANALYSIS CLASSIFICATION | EXPECTED EFFECT | SUGGESTION OUTLINE |
| New ☀ | 🔍📷 | 📷 | 13 MINUTES/DAY | THERE IS SUGGESTION FOR OPERATION IMPROVEMENT RELATED TO PRINTING INTERRUPTION TIME OF MACHINE A |
| New | 📷🔍⬡ | 📷 | — | THERE IS DIFFERENCE BETWEEN STOP TIME OF MACHINE A AND STOP TIME OF MACHINE B |
| New | ↻ | ↻ | — | DIFFERENCE BETWEEN EXPECTED TIME AND ACTUAL TIME OF PRINTING EXCEEDS 50% IN FILE CCC.pdf |
| New | 📷 | 📷 | — | PRODUCTIVITY OF MACHINE C HAS INCREASED BY 10% AS COMPARED WITH PRODUCTIVITY OF WEEK BEFORE LAST |

INFORMATION PROCESSING APPARATUS, PRODUCTIVITY MANAGEMENT METHOD, AND PROGRAM

The entire disclosure of Japanese patent Application No. 2021-018714, filed on Feb. 9, 2021, is incorporated herein by reference in its entirety.

BACKGROUND

Technological Field

The present invention relates to an information processing apparatus that manages productivity by processing information obtained from one or more image forming apparatuses, a productivity management method, and a program.

Description of the Related Art

A technique is known in which an operation rate of a printer is calculated and a difference between operation records of a plurality of the printers of a printing company is visualized by comparing the operation records. By visualizing the difference between the operation records, it is found that the operation rate of which each printer is decreasing.

As a method for calculating the operation rate, JP 2009-211256 A describes a technique of calculating the operation rate by using a job execution time by not including an interruption time due to an error during a job execution when calculating the operation rate of the image forming apparatus.

However, the technique described in JP 2009-211256 A does not suggest an improvement measure as to how to increase the operation rate of the printer of which the operation rate has decreased. Even when only operation record data is displayed, there is a problem that the improvement measure cannot be found depending on skill of a productivity management manager, and the improvement cannot be achieved.

SUMMARY

From the situation described above, a method for outputting the improvement measure for increasing the productivity of the image forming apparatus has been desired.

To achieve the abovementioned object, according to an aspect of the present invention, there is provided an information processing apparatus that manages productivity by processing information obtained from one or more image forming apparatuses, and the information processing apparatus reflecting one aspect of the present invention comprises: a hardware processor that: acquires operation history information from the image forming apparatus; analyzes the operation history information and determines an improvement measure for improving the productivity based on an analysis result; and outputs the improvement measure.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIG. 10 is a diagram illustrating an example of an analysis result screen with respect to operation log data of an image forming apparatus according to a first embodiment of the present invention;

FIG. 11 is a diagram illustrating a legend of graphic symbols displayed on an analysis result screen according to a first embodiment of the present invention;

FIG. 12 is a diagram illustrating an example of a detailed screen (1) of an analysis and improvement recommendation according to a first embodiment of the present invention;

FIG. 13 is a diagram illustrating an example of a detailed screen (2) of an analysis and improvement recommendation according to a first embodiment of the present invention;

FIG. 16 is a diagram illustrating an example of a screen displaying an analysis result of last week according to a second embodiment of the present invention.

DETAILED DESCRIPTION OF EMBODIMENTS

Figure 1:
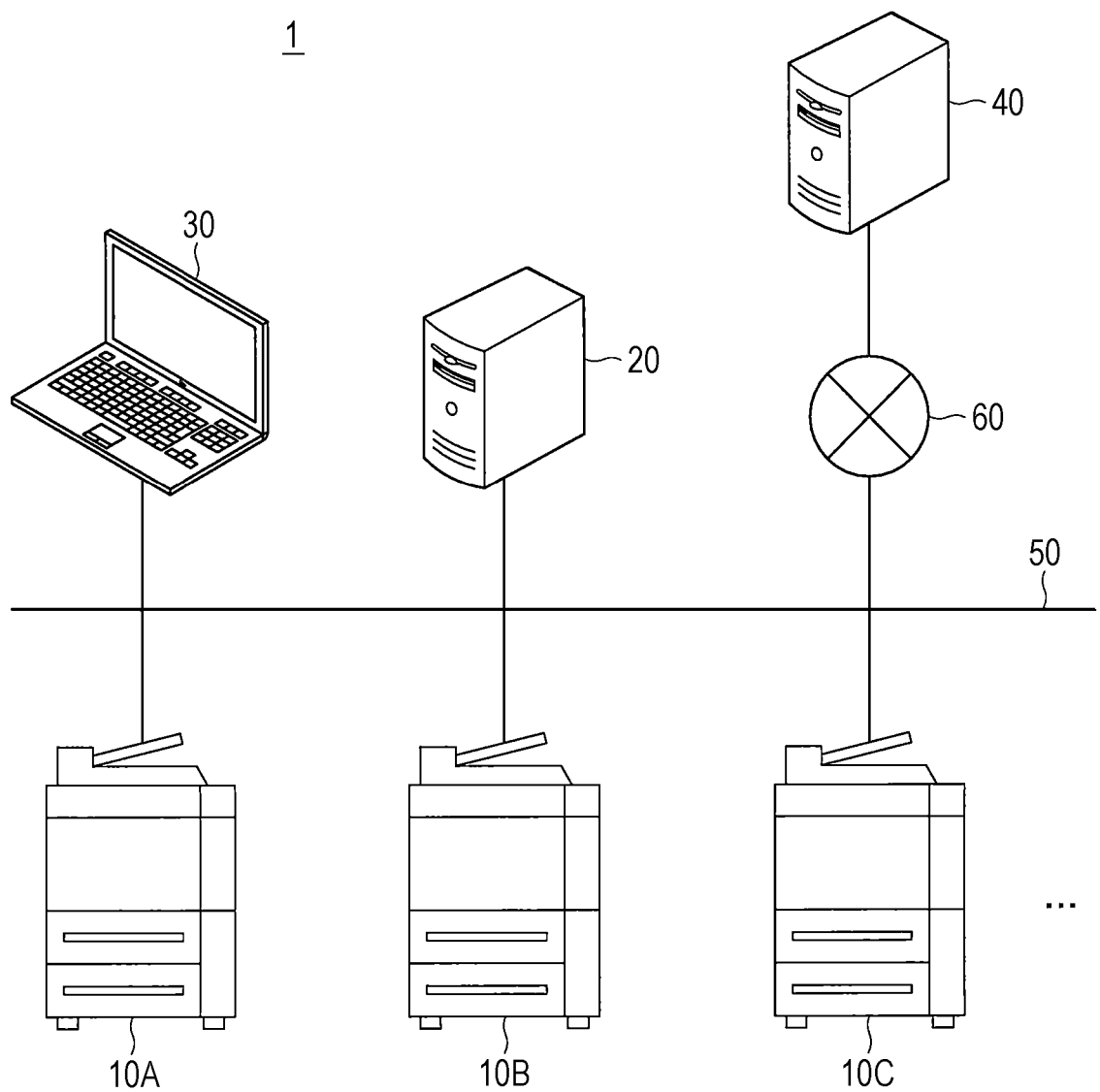
FIG. 1 is a schematic diagram illustrating a network configuration example of a productivity management system according to a first embodiment of the present invention.

Hereinafter, one or more embodiments of the present invention will be described with reference to the drawings. However, the scope of the invention is not limited to the disclosed embodiments. In the present specification and the accompanying drawings, constituent elements having substantially the same function or configuration are denoted by the same reference numerals, and duplicate description will be omitted.

First Embodiment

First, a productivity management system that manages productivity of one or more image forming apparatuses according to the first embodiment of the present invention will be described with reference to FIG. 1.

[Productivity Management System]

FIG. 1 is a schematic diagram illustrating a network configuration example of a productivity management system 1.

The productivity management system 1 includes image forming apparatuses 10A, 10B, and 10C, a print server 20, a productivity management terminal 30, and an information processing apparatus 40, and the apparatuses are connected to each other so as to be capable of communicating with each other.

The image forming apparatuses 10A, 10B, and 10C execute processing (also referred to as print processing) of forming an image on a recording material based on an input print instruction. The image forming apparatuses 10A, 10B, and 10C output operation log data to a network 50 according to an operation history. Three image forming apparatuses 10A, 10B, and 10C are illustrated in FIG. 1, but the number of the image forming apparatuses may be one or more, or may be four or more. Hereinafter, in a case where the image forming apparatuses 10A, 10B, and 10C are not distinguished or a common function is described, the image forming apparatuses 10A, 10B, and 10C may be referred to as "image forming apparatus 10". The image forming apparatuses 10A, 10B, and 10C may be a multifunction apparatus having other functions in addition to a print function. For example, examples of other functions include a copy function, a scan function, and a facsimile function.

The print server 20 is communicatively connected to each of the image forming apparatuses 10A to 10C. The print server 20 relays communication between the image forming apparatuses 10A to 10C and other apparatuses. For example, the print server 20 receives a print job from a user terminal (not illustrated) via the network 50, and instructs the image forming apparatuses 10A to 10C to print.

The productivity management terminal 30 displays information regarding the productivity of the image forming apparatuses 10A to 10C, the information being provided from the information processing apparatus 40 via the networks 50 and 60. As the productivity management terminal 30, a personal computer, a mobile terminal, or the like can be used. A productivity management manager confirms productivity information displayed on the productivity management terminal 30, manages the productivity of the image forming apparatuses 10A to 10C, and manipulates the image forming apparatuses 10A to 10C.

The information processing apparatus 40 acquires and analyzes the operation log data from the image forming apparatuses 10A to 10C via the networks 50 and 60, and manages the productivity of the image forming apparatuses 10A to 10C based on the analysis result. For example, the information processing apparatus 40 manages a plurality of the image forming apparatuses 10 connected to the network 50 separately for different customers based on a table in which the image forming apparatuses are associated with respective customers. The information processing apparatus 40 transmits, as information regarding the productivity of the image forming apparatuses 10A to 10C, a result obtained by analyzing the operation log data (including an improvement measure) to the productivity management terminal 30. The information processing apparatus 40 is configured as a web server. In this case, the productivity management terminal 30 operates as a web client (web browser).

The network 50 is a premises network such as a LAN, and the network 60 is a wide area network such as the Internet, which corresponds to a so-called cloud. The network 50 and the network 60 are communicatively connected via a relay device such as a router (not illustrated). The network 50 and the network 60 may be one network.

A print controller 200 (FIG. 2) of the image forming apparatus 10 may be configured by applying Web-based Distributed Authoring and Versioning (WebDAV). WebDAV is a distributed file system that has a function of copying or deleting files directly with respect to the web server and acquiring and setting file information such as a file owner and update time and date, and is implemented with a protocol obtained by extending HTTP 1.1. In a case where the print server 20 is configured to relay communication between the image forming apparatus 10 and the network 50, WebDAV may be applied to the print server 20.

An accumulation server (not illustrated) for accumulating the operation log data output by the image forming apparatus 10 may be connected to the network 60 (cloud), and the information processing apparatus 40 may acquire the operation log data of the image forming apparatus 10 from the accumulation server. In this case, message queuing (web service), in which data can be asynchronously transmitted and received between the accumulation server and the information processing apparatus 40, may be introduced on the network 60 (cloud). Alternatively, message queuing middleware may be implemented in the information processing apparatus 40.

Next, a hardware configuration of each of the apparatuses constituting the productivity management system 1 will be described.

[Hardware Configuration of Image Forming Apparatus]

Figure 2:
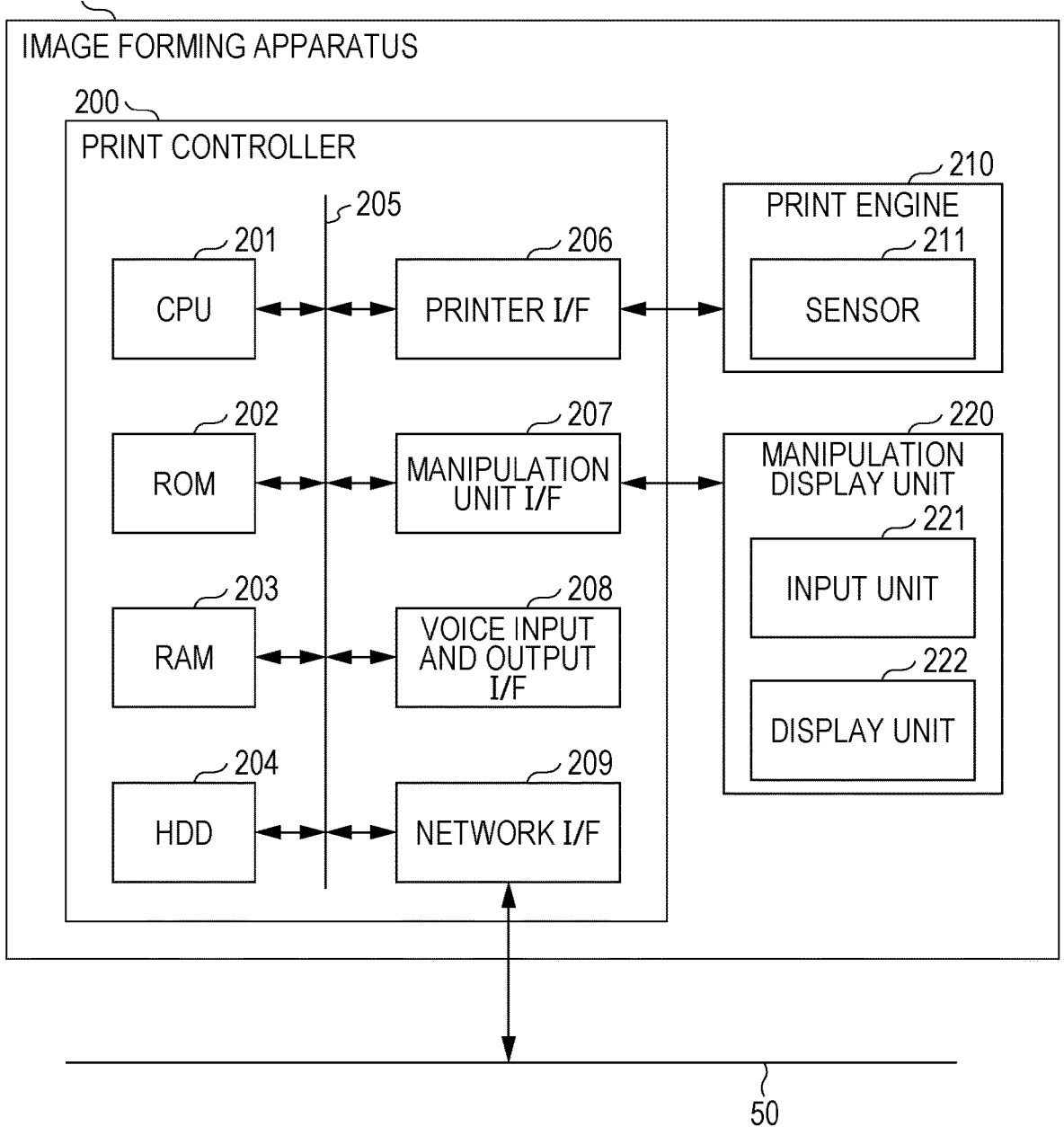
FIG. 2 is a block diagram illustrating a hardware configuration example of a printer according to a first embodiment of the present invention.

FIG. 2 is a block diagram illustrating a hardware configuration example of the image forming apparatus 10.

The image forming apparatus 10 includes the print controller 200, a print engine 210, and a manipulation display unit 220.

The print controller 200 receives a print document file from the user terminal (not illustrated), generates image data, and transmits data to the print engine 210. The print controller 200 includes a CPU 201, a ROM 202, a RAM 203, a hard disk (HDD) 204, a printer I/F 206, a manipulation unit I/F 207, a voice input and output I/F 208, and a network I/F 209. Each of these devices is connected with each other via a system bus 205.

The CPU 201 comprehensively controls access to various devices connected to the system bus 205 based on a control program stored in the ROM 202 or the HDD 204. The ROM 202 stores the control program that can be executed by the CPU 201. The RAM 203 mainly functions as a main memory of the CPU 201, for example, a work area, and memory capacity can be expanded by an optional RAM connected to an expansion port (not illustrated). The HDD 204 stores a boot program, various application programs, font data, a user file, an edit file, and the like. Although the HDD 204 is used in the present embodiment, an external storage device such as an SD card or a flash memory may be used in addition to the HDD 204.

The printer I/F 206 controls output of the image data to the print engine 210 which is a mechanism for executing print processing. The print engine 210 executes the print processing (transfers a color material such as toner or ink to a recording material) based on the input image data by an electrophotographic method, an inkjet recording method, or the like. The print engine 210 includes a plurality of sensors 211, detects a state of a driver, an actuator, or the like (not illustrated) in the image forming apparatus 10 by using a plurality of the sensors 211, and outputs detection data to the printer I/F 206.

Each of the sensors 211 is an optical sensor, a temperature sensor, a humidity sensor, a voltmeter, an ammeter, an acceleration sensor, an encoder, an image sensor, or the like. The printer I/F 206 may include an A/D converter that converts an analog signal into a digital signal in a case where the analog signal is input from the sensor 211.

The image forming apparatus 10 is provided with a door opening and closing detection sensor (not illustrated) that detects opening and closing of a door attached to the image forming apparatus 10, and a tray draw-out detection sensor that detects draw-out and storage of a paper feed tray. For example, when the door opening and closing detection sensor detects the door opening or the tray draw-out detection sensor detects the draw out of the tray, the print engine 210 does not execute the print processing. A sensor that affects an operation of the print engine 210, such as the door opening and closing detection sensor or the tray draw-out detection sensor, is included in the sensor 211.

The manipulation unit I/F 207 controls display of a display unit 222 included in the manipulation display unit 220 and input of various setting information set by an input unit 221. For example, the manipulation display unit 220 includes a liquid crystal display panel as the display unit 222 and a touch sensor as the input unit 221. The voice input and output I/F 208 controls input and output of voice with a voice input and output device such as a microphone, a speaker, and a headset (not illustrated).

The network I/F 209 receives image data for outputting to the print engine 210 and information (print setting) necessary for print control from the print server 20 via the network 50.

In a case where the image forming apparatus 10 and the print server 20 are connected by a dedicated line and the image forming apparatus 10 communicates with the network 50, the communication may be performed by relaying the print server 20. In a case where the dedicated line is used, each of the image forming apparatus 10 and the print server 20 may include a control system I/F (not illustrated) for communicating information necessary for the print control, and an image data system I/F (not illustrated) for communicating image data to be printed.

In the image forming apparatus 10, the CPU 201 acquires the detection data of a plurality of the sensors 211 via a printer I/F 209 and stores the detection data as operation log data in the HDD 204. The CPU 201 transmits the operation log data of the image forming apparatus 10 to the information processing apparatus 40 via the network I/F 209 and the network 50.

[Hardware Configuration of Print Server]

Figure 3:
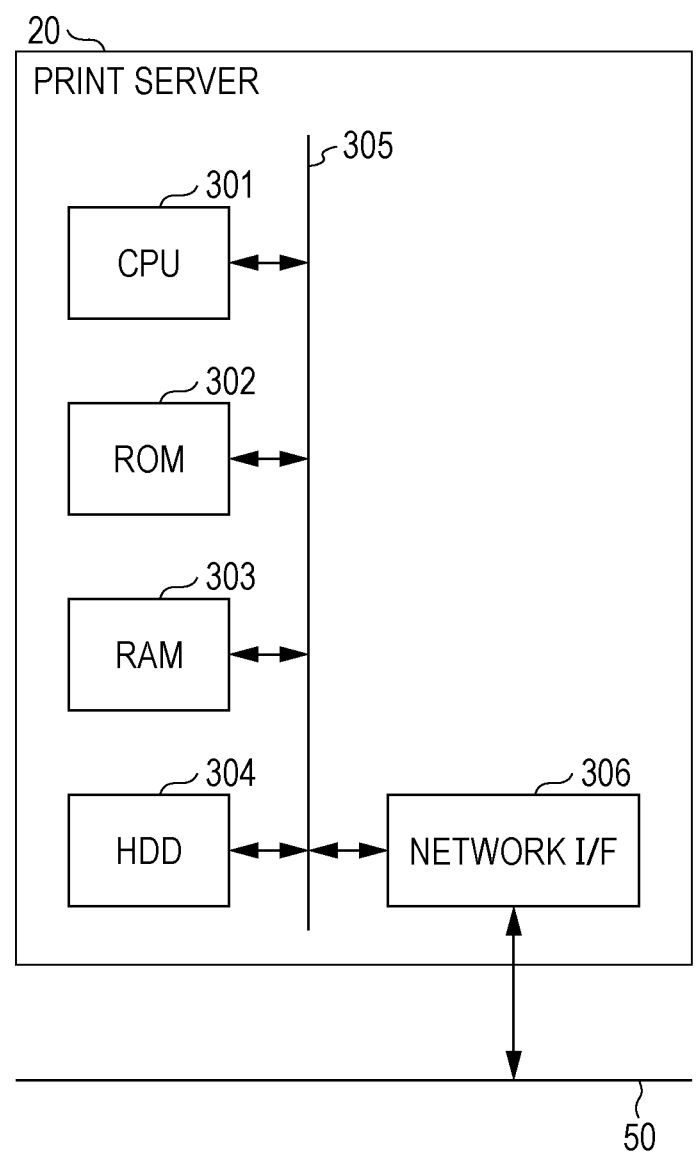
FIG. 3 is a block diagram illustrating a hardware configuration example of a print server according to a first embodiment of the present invention.

FIG. 3 is a block diagram illustrating a hardware configuration example of the print server 20.

The print server 20 performs processing necessary for executing print processing, such as analysis processing of an input print job and expansion processing to the image data. The print server 20 includes a CPU 301, a ROM 302, a RAM 303, a hard disk (HDD) 304, and a network I/F 306. Each of the devices is connected with each other via a system bus 305.

The CPU 301 comprehensively controls access to various devices connected to the system bus 305 based on a control program stored in the ROM 302 or the HDD 304. The ROM 302 stores the control program that can be executed by the CPU 301. The RAM 303 mainly functions as a main memory of the CPU 301, for example, a work area, and memory capacity can be expanded by an optional RAM connected to an expansion port (not illustrated). The HDD 304 stores a boot program, various application programs, font data, a user file, an edit file, print job data, and the like. Although the HDD 304 is used in the present embodiment, an external storage device such as an SD card or a flash memory may be used in addition to the HDD 304.

The network I/F 306 performs data communication with the network 50 via a network cable. The network I/F 306 transmits, to the image forming apparatus 10, information necessary for the print control (print setting) and image data output from the print engine 210.

As described above, the print server 20 may relay the communication between the image forming apparatus 10 and the network 50. At this time, in the print server 20, the control system I/F performs data communication with the image forming apparatus 10, and the network I/F performs data communication with the network 50.

[Hardware Configuration of Productivity Management Terminal]

Figure 4:
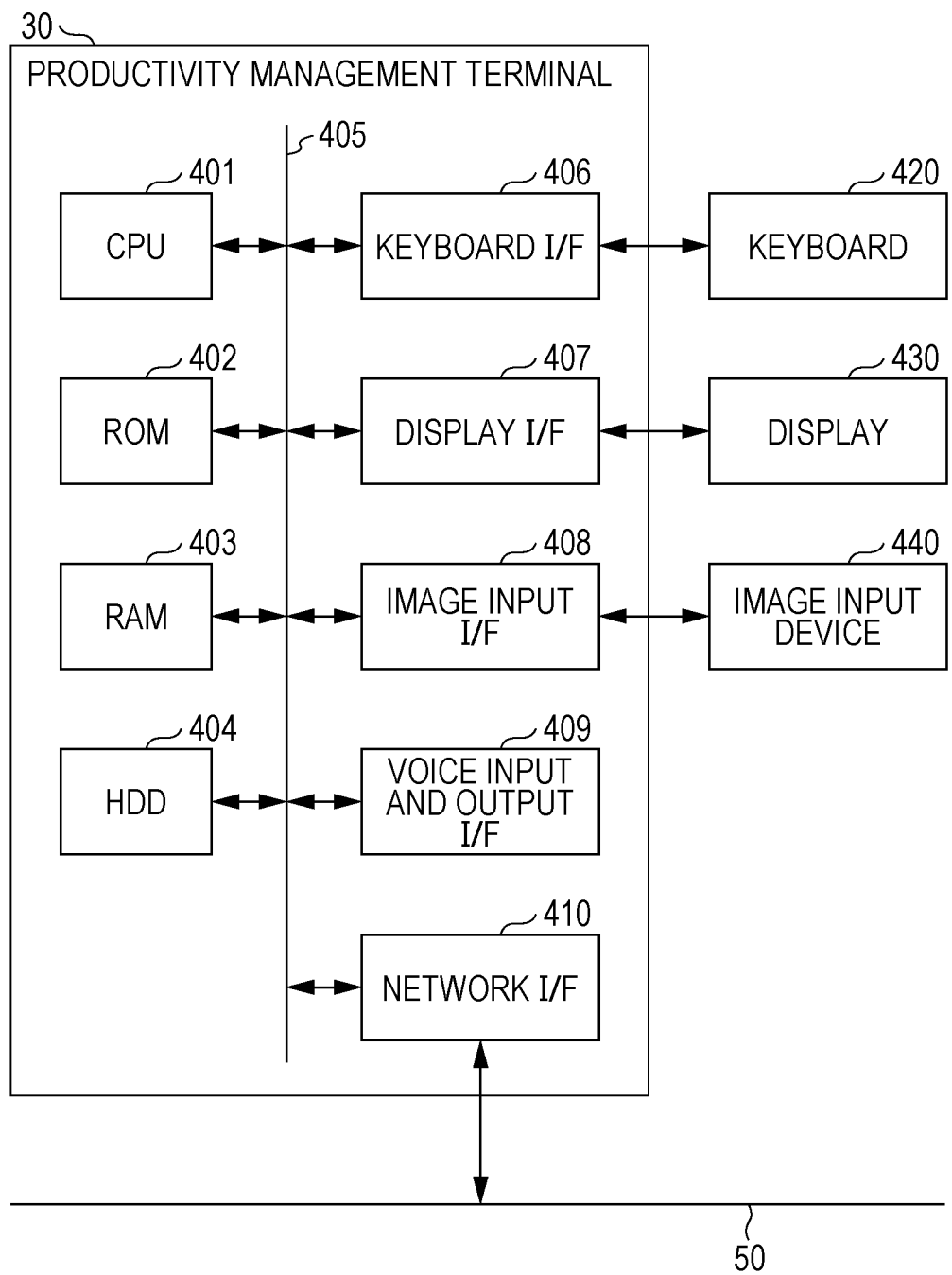
FIG. 4 is a block diagram illustrating a hardware configuration example of a productivity management terminal according to a first embodiment of the present invention.

FIG. 4 is a block diagram illustrating a hardware configuration example of the productivity management terminal 30.

The productivity management terminal 30 includes a CPU 401, a ROM 402, a RAM 403, a hard disk (HDD) 404, a keyboard I/F 406, a display I/F 407, an image input I/F 408, a voice input and output I/F 409, and a network I/F 410. Each of the devices is connected with each other via a system bus 405.

Since functions of the CPU 401, the ROM 402, the RAM 403, and the HDD 404 are the same as the functions of the corresponding devices of the print server 20, detailed description thereof will be omitted.

The keyboard I/F 406 controls key input from a keyboard 420 and a pointing device (not illustrated). The display I/F 407 controls display of a display 430. The image input I/F 408 controls image input from an image input device 440 such as a camera. The voice input and output I/F 409 controls input and output of voice with the voice input and output device such as a microphone, a speaker, and a headset (not illustrated).

The network I/F 410 performs data communication with the network 50 via a network cable. As described above, the productivity management terminal 30 may be configured to perform communication with the image forming apparatus 10 by relaying the print server 20.

[Hardware Configuration of Information Processing Apparatus]

Figure 5:
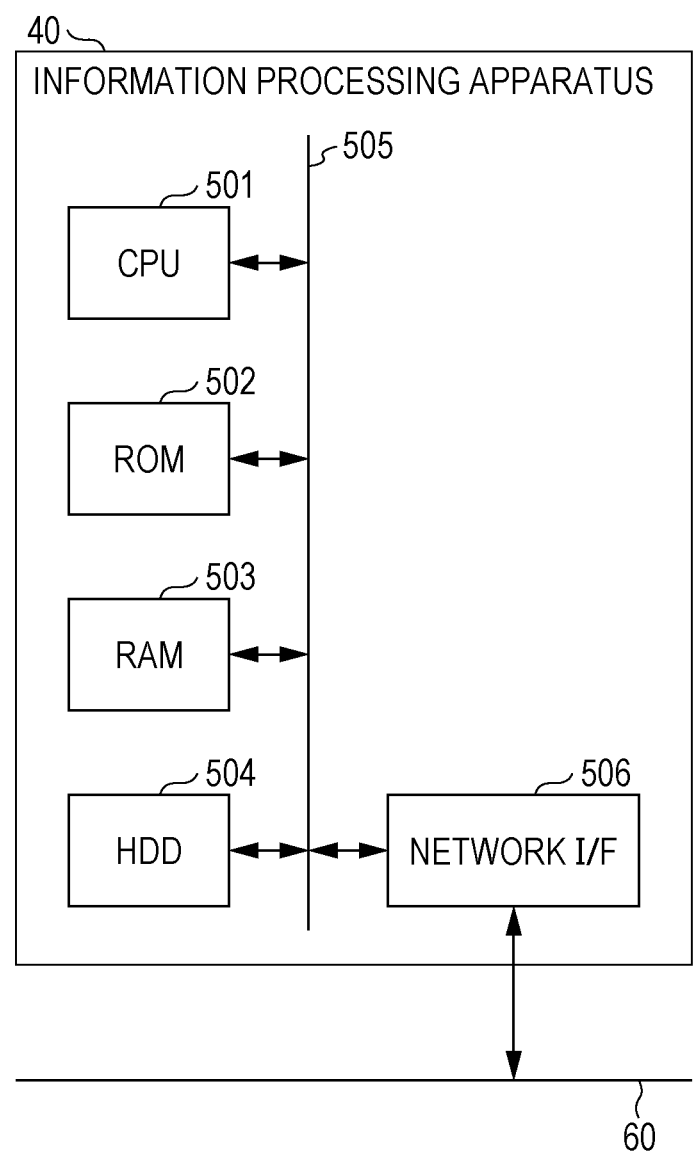
FIG. 5 is a block diagram illustrating a hardware configuration example of an information processing apparatus according to a first embodiment of the present invention.

FIG. 5 is a block diagram illustrating a hardware configuration example of the information processing apparatus 40.

The information processing apparatus 40 includes a CPU 501, a ROM 502, a RAM 503, a hard disk (HDD) 504, and a network I/F 506. Each of the devices is connected with each other via a system bus 505.

Since functions of the CPU 501, the ROM 502, the RAM 503, and the HDD 504 are the same as the functions of the corresponding devices of the print server 20, detailed description thereof will be omitted.

The network I/F 506 performs data communication with the network 60 via a network cable. As described above, the network 50 and the network 60 may be one network. The information processing apparatus 40 may be configured to perform communication with the image forming apparatus 10 by relaying the print server 20.

[Functional Configuration of Image Forming Apparatus]

Figure 6:
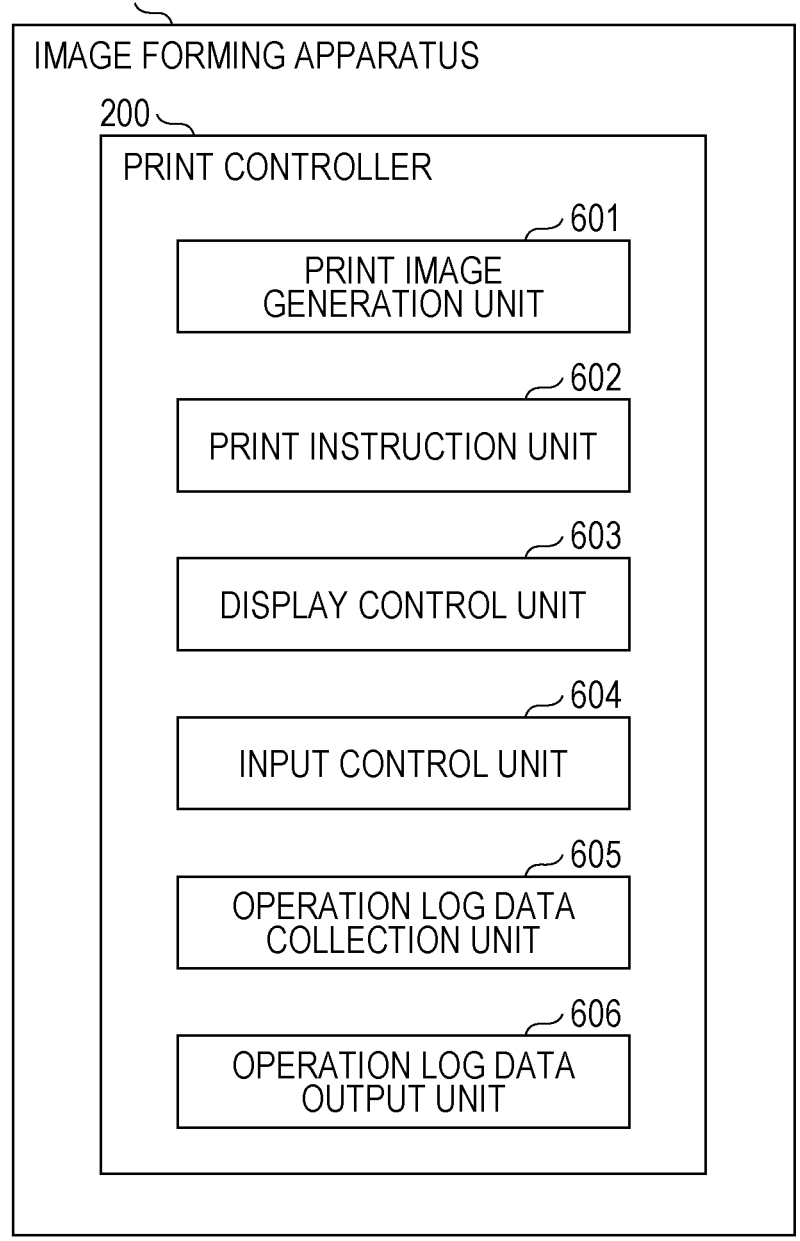
FIG. 6 is a block diagram illustrating a functional configuration example of an image forming apparatus according to a first embodiment of the present invention.

FIG. 6 is a block diagram illustrating a functional configuration example of the image forming apparatus 10.

The print controller 200 of the image forming apparatus 10 includes a print image generation unit 601, a print instruction unit 602, a display control unit 603, an input control unit 604, an operation log data collection unit 605, and an operation log data output unit 606. These functions are realized by the CPU 201 reading and executing the control program stored in the ROM 202.

The print image generation unit 601 generates image data necessary for print processing operation of the print engine 210 based on the print document file and the print setting.

The print instruction unit 602 outputs the print setting and the image data to the print engine 210, and instructs print execution.

The display control unit 603 controls the display unit 222 to display a state of the image forming apparatus 10 (printable/unprintable, in process of color adjustment processing, remaining amount of consumable material, and the like), and a state of the paper feed tray.

The input control unit 604 receives an input signal corresponding to a user manipulation to the input unit 221, and then performs change of the print setting, an execution instruction of a color adjustment, a print stop, a print restart instruction, and the like.

The operation log data collection unit 605 collects detection data of the sensors in the image forming apparatus 10 including a plurality of the sensors 211 and operation data of the actuator, and stores the data as the operation log data in the RAM 203 or the HDD 204 of the image forming apparatus 10. The operation log data includes not only sporadic error data and image quality abnormality data during job execution based on the sensor, but also an operation history (power on/off, an action history, a user manipulation history) and all of the related information of the image forming apparatus 10. For example, the operation log data collection unit 605 collects, as the operation history and the related information, log data of panel manipulation of the manipulation display unit 220, log data of draw out and storage of the paper feed tray, information regarding the recording material stored in the paper feed tray, log data at the time of start/interruption/end of the print, and log data at the time of opening and closing a door of a main body of the image forming apparatus 10 or a door of a post processing apparatus (not illustrated).

The operation log data output unit 606 outputs the operation log data stored by the operation log data collection unit 605 to the information processing apparatus 40 via the networks 50 and 60.

[Functional Configuration of Print Server]

Figure 7:
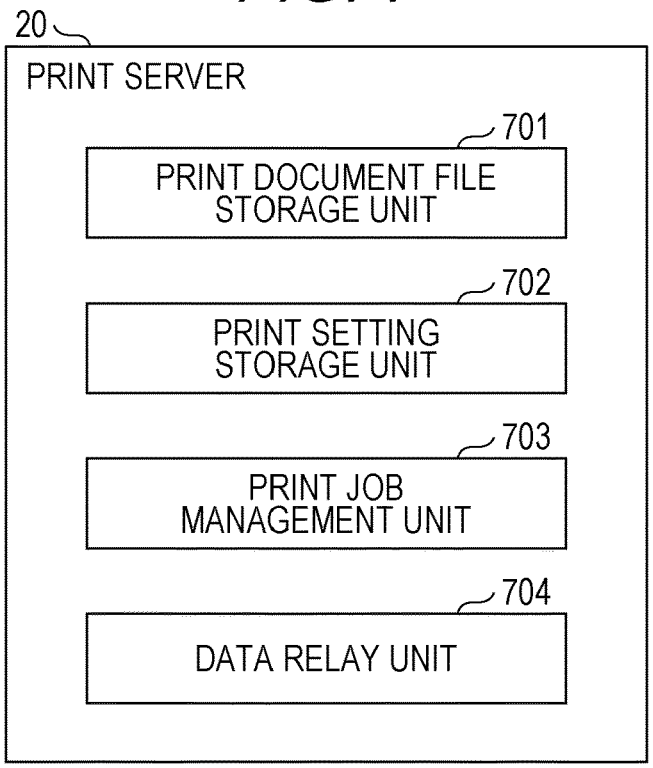
FIG. 7 is a block diagram illustrating a functional configuration example of a print server according to a first embodiment of the present invention.

FIG. 7 is a block diagram illustrating a functional configuration example of the print server 20.

The print server 20 includes a print document file storage unit 701, a print setting storage unit 702, a print job management unit 703, and a data relay unit 704. These functions are realized by the CPU 301 reading and executing the control program stored in the ROM 302.

The print document file storage unit 701 stores the print document file transmitted from the user terminal (not illustrated) by using a job management application (print driver) in the HDD 304.

The print setting storage unit 702 associates a print document stored by the print document file storage unit 701 with the print setting necessary for image data generation and print processing, and stores them in the HDD 304.

The print job management unit 703 manages print job data received from the user terminal. Specifically, the print job management unit 703 performs processing such as calling the print job data stored in the HDD 304, reflecting the print job setting changed by the user terminal, and managing the history of the printed job.

The data relay unit 704 analyzes the data received by the network I/F 306. In a case where it is determined that there is data to be relayed between the image forming apparatus 10 and the network 50, the data relay unit 704 performs control of relaying the data.

[Functional Configuration of Productivity Management Terminal]

Figure 8:
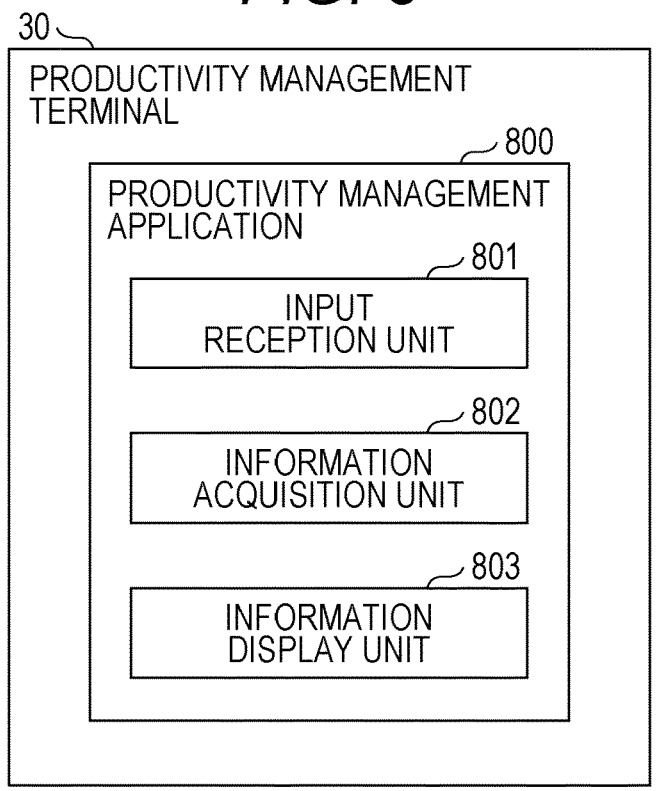
FIG. 8 is a block diagram illustrating a functional configuration example of a productivity management terminal according to a first embodiment of the present invention.

FIG. 8 is a block diagram illustrating a functional configuration example of the productivity management terminal 30.

A productivity management application 800 is installed in the productivity management terminal 30. The productivity management application 800 is a browser for browsing information regarding productivity management, and includes an input reception unit 801, an information acquisition unit 802, and an information display unit 803. These functions are realized by the CPU 401 reading and executing the control program stored in the ROM 402.

The input reception unit 801 includes an interface for receiving the manipulation of the productivity management manager with respect to the keyboard 420. For example, the input reception unit 801 receives the following request for displaying information regarding the productivity of the image forming apparatus 10.

Display of productivity monitoring state (analysis outline) (for example, analysis result of operation log data (FIG. 10), and analysis result (FIG. 16))

Display of productivity decrease information (analysis details) (for example, details of analysis and improvement recommendation (FIGS. 12 and 13))

Display of productivity improvement information (for example, analysis result of operation log data (FIG. 10), and analysis and improvement recommendation (FIG. 15))

The information acquisition unit 802 acquires information regarding the productivity of the image forming apparatus 10 from the information processing apparatus 40 based on the user manipulation received by the input reception unit 801.

The information display unit 803 displays the requested information on the display 430 based on information regarding the productivity of the image forming apparatus 10, which is acquired by the information acquisition unit 802 from the information processing apparatus 40.

[Functional Configuration of Information Processing Apparatus]

Figure 9:
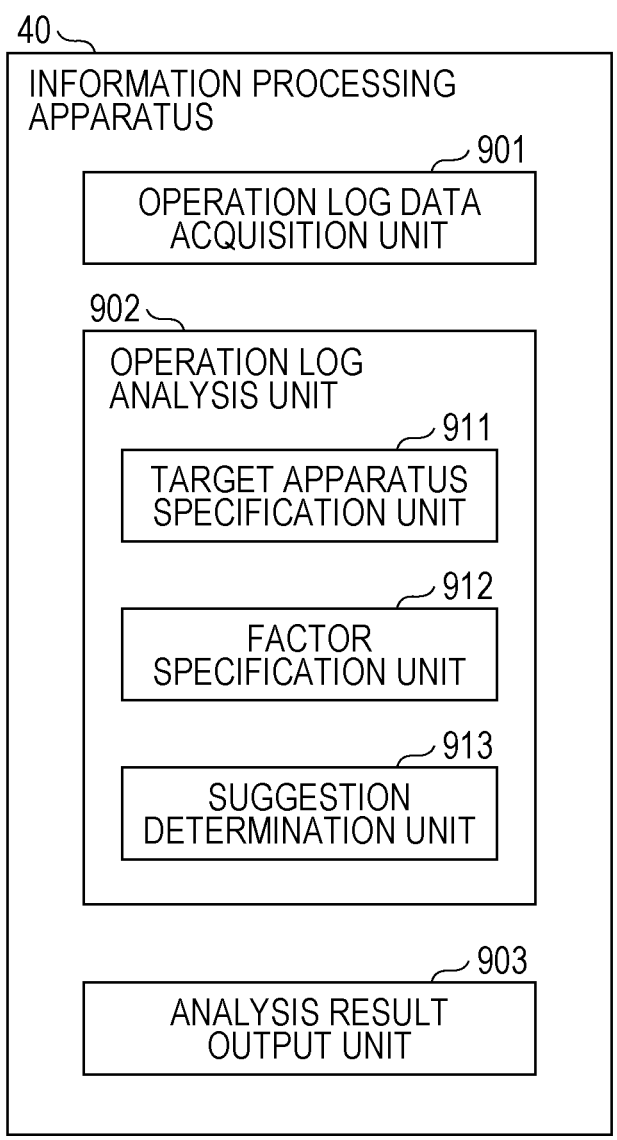
FIG. 9 is a block diagram illustrating a functional configuration example of an information processing apparatus according to a first embodiment of the present invention.

FIG. 9 is a block diagram illustrating a functional configuration example of the information processing apparatus 40.

The information processing apparatus 40 includes an operation log data acquisition unit 901, an operation log analysis unit 902, and an analysis result output unit 903. These functions are realized by the CPU 501 reading and executing the control program stored in the ROM 502.

The operation log data acquisition unit 901 acquires the operation log data from the image forming apparatus 10 and stores the operation log data in the HDD 404. The operation log data acquisition unit 901 collects the operation log data from one or more image forming apparatuses 10 connected to the network 50 at predetermined time intervals such as several milliseconds.

The operation log analysis unit 902 analyzes the operation log data of the image forming apparatus 10, which is stored in the HDD 404, and suggests an improvement measure for improving the productivity based on the analysis results. The operation log analysis unit 902 calculates the effect obtained by implementing the improvement measure described above. The operation log analysis unit 902 executes analysis processing in the background of the operation log data acquisition unit 901. The operation log analysis unit 902 includes a target apparatus specification unit 911, a factor specification unit 912, and a suggestion determination unit 913.

The target apparatus specification unit 911 analyzes the operation log data of one or more image forming apparatuses 10, and based on the analysis result, performs processing of specifying the image forming apparatus 10 necessary to be improved (improvement target apparatus) of which the productivity is decreasing as compared with a reference value. The reference value is an average value of an operation rate or an interruption time of a predetermined comparison unit (weekly units, daily units, machine units, entire factory, or a combination thereof). The reference value may be a fixed value set in advance.

The factor specification unit 912 analyzes the operation log data of the image forming apparatus 10 that needs to be improved, and based on the analysis result, performs processing of specifying the factor that decreases the productivity of the image forming apparatus 10.

The suggestion determination unit 913 analyzes the operation log data of the image forming apparatus 10 that needs to be improved, and based on the analysis result, performs processing of determining an improvement measure to the factor that decreases the productivity of the image forming apparatus 10. At this time, the suggestion determination unit 913 specifies a basis for the determined improvement measure based on the analysis result, and outputs the basis together with the improvement measure to the analysis result output unit 903. The content of the improvement measure based on the analysis result of the operation log data may be set and registered in advance, and recorded in the HDD 504, or may be appropriately updated by using machine learning such as a neural network.

The analysis result output unit 903 performs processing of outputting the analysis result (including only the analysis result or the improvement measure) of the operation log analysis unit 902 to the productivity management terminal 30.

[Analysis Result Screen of Operation Log Data]

Next, the analysis result screen for the operation log data of the image forming apparatus 10, which is displayed on the productivity management terminal 30, will be described with reference to FIG. 10.

FIG. 10 illustrates an example of a screen that displays the analysis result for the operation log data of the image forming apparatus 10 which is displayed on the productivity management terminal 30. When the productivity management manager starts the productivity management application (browser) and logs in, the productivity management terminal 30 accesses the information processing apparatus 40, and an analysis result screen 1000 is displayed on a top screen.

On the analysis result screen 1000, an analysis result report 1010 of last week and an analysis result report 1020 of the week before last are displayed. The last week is a week before the week (for example, this week) including the day when the productivity management terminal 30 accesses the information provided by the information processing apparatus 40. Here, the last week is the 41st week (10/04 (Sun) to 10/10 (Sat)) starting from the week when the productivity management is started. The week before last is the 40th week (9/27 (Sun) to 10/03 (Sat)). The analysis result report 1010 of the 41st week includes one analysis result (record), and the analysis result report 1020 of the 40th week includes three analysis results (records) 1021 to 1023.

In the example of FIG. 10, the analysis result includes fields of Suggestion, Suggestion Type, Analysis Classification, Expected Effect, and Suggestion Outline.

"Suggestion" indicates a graphic symbol such as a pictogram (graphic symbols 1101 and 1102 in FIG. 11) so that the content of the suggestion can be understood at a glance. The suggestion can be broadly divided into two suggestions (reports), for example, an improvement measure (improvement action) for improving productivity, and analysis and discovery.

"Suggestion Type" indicates a type of the suggestion content (graphic symbols 1103 to 1106 in FIG. 11) shown in the "Suggestion" field.

"Analysis Classification" indicates classification of the factors of the productivity decrease specified by the analysis (graphic symbols 1107 to 1109 in FIG. 11).

"Expected Effect" indicates an effect expected by implementing the improvement measure. The expected effect is expressed as "XX minutes/day" or "XX minutes/week" to indicate how many minutes the productivity is expected to be improved in a day or a week. "XX minutes/day" or "XX minutes/week" is variable depending on the operation record of the image forming apparatus 10.

"Suggestion Outline" indicates the outline of the suggestions (report) of the improvement measure and the analysis and discovery. The suggestion outline indicates what kind of improvement suggestions (for example, operation improvement, change of apparatus configuration, and the like) are present for the factors (for example, printing interruption time, printing preparation time, and printing time) that decrease the productivity of a specific machine (for example, one of the machines owned by a printing company, such as Machine A, Machine No. 1). The contents of "specific machine", "factors that decrease productivity", and "what kind of improvement" are variable depending on the operation record of the image forming apparatus 10.

For example, in the analysis result report 1010, the "Suggestion Outline" provides the outline of the analysis result obtained by comparing the 41st week with the week before the 41st week.

In an analysis result 1021 of the analysis result report 1020, the graphic symbol 1101 is set for "Suggestion", the graphic symbols 1103 and 1104 are set for "Suggestion Type", the graphic symbol 1107 is set for "Analysis Classification", and 94 minutes/week is set for "Expected Effect". A message that "[40th Week] By improving the interruption time due to a paper shortage in Machine A and Machine B, it is possible to obtain an improvement effect of about 94 minutes/week" in the "Proposal Outline" is indicated in the "Suggestion Outline". Machines A and B are common names for machines used in the factory, and may be represented by other names such as Machine No. 1 and Machine No. 2.

In a case where an improvement measure is suggested for a printing time, "Printing time is short and the operation rate is low, please print more", and "There are variations in the printing time between the machines or in weekly units/monthly units, please level the printing time" can be suggested. It is also possible to display the analysis result suggesting that there is some tendency such as "There is some tendency in the printing time in weekly units/monthly units".

In a case where the details of the analysis result is desired to confirm, when the suggestion (any line) desired to confirm from the list of the analysis results is selected, the suggestion basis for the suggestion and the details of the improvement action will be displayed. In the example of FIG. 10, by placing a pointer (white arrow) to the analysis result 1021 and then clicking a mouse device, the screen is transited to a detailed screen 1200 (see FIG. 12) of the analysis and improvement recommendation showing the details of the analysis result 1021.

Here, the legend of the graphic symbols displayed on the analysis result screen will be described with reference to FIG. 11.

FIG. 11 illustrates the legend of the graphic symbols displayed on the analysis result screen. These graphic symbols are also used in a screen other than the analysis result screen.

(Suggestion)

The graphic symbol 1101 is a picture representing a miniature light bulb, and indicates a suggestion or a report for the improvement action (improvement measure).

The graphic symbol 1102 is a picture representing a magnifying glass and indicates a suggestion or a report for the analysis and discovery.

(Suggestion Type)

The graphic symbol 1103 is a picture representing a person and indicates a suggestion or a report regarding an operation.

The graphic symbol 1104 is a picture representing a printer and indicates a suggestion or a report regarding a machine.

The graphic symbol 1105 is a picture representing a corrugated cardboard and indicates a suggestion or a report regarding a material.

The graphic symbol 1106 is a picture indicating a management cycle, and indicates a suggestion or a report regarding a method and process.

The graphic symbols 1103 to 1106 represent resources used in implementation of a work, so-called four elements of production (Man, Machine, Material, and Method).

(Analysis Classification)

The graphic symbol 1107 is a picture representing a printer and an hourglass, and indicates a suggestion or a report regarding a printing interruption time.

The graphic symbol 1108 is a picture representing power supply standby and the hourglass, and indicates a suggestion or a report regarding an operation time.

The graphic symbol 1109 is a picture representing a manual feed tray and the hourglass, and indicates a suggestion or a report regarding a printing preparation time.

[Detailed Screen (1) of Analysis and Improvement Recommendation]

FIG. 12 illustrates an example of a detailed screen (1) of the analysis and improvement recommendation.

The detailed screen 1200 of the analysis and improvement recommendation illustrated in FIG. 12 indicates a more detailed analysis result and a more detailed suggestion for the improvement measure with respect to the selected analysis result. The detailed screen 1200 of the analysis and improvement recommendation indicates an example in which an analysis result 1021, an analysis classification area 1210, an analysis result area 1220, and an improvement recommendation area 1230 are provided. The analysis result 1021 is displayed at the top portion of the detailed screen 1200 of the analysis and improvement recommendation. Below the analysis result 1021, the analysis classification area 1210, the analysis result area 1220, and the improvement recommendation area 1230 are displayed in this order. By displaying the analysis result 1021 including the suggestion outline on the top portion of the screen, the productivity management manager can easily grasp which analysis result the detailed screen of the analysis and improvement recommendation corresponds to.

(Analysis Classification Area)

The analysis classification area 1210 is an area showing the classification of the factors of the productivity decrease specified by the analysis of the operation log analysis unit 902 and the basis thereof. Here, "Printing interruption time" is shown as the classification of the specified factors, and the basis for classifying the factors of the productivity decrease into "Printing interruption time" is shown. In FIG. 12, a machine operation rate 1211, a production result graph 1212 by time classification (entire factory), a target apparatus 1213, and an increase and decrease in production efficiency 1214 are displayed as information showing the basis. Here, the "Machine" and the "apparatus" refer to an image forming apparatus. The information showing the basis for FIG. 12 is an example, and display information and a display mode are not limited to this example.

The production result graph 1212 by time classification (entire factory) is the operation record, and shows "Printing time", "Idle time", "Printing preparation time", and "Printing interruption time". The total time of the printing time, the idle time, the printing preparation time, and the printing interruption time is "Machine operation time". "Machine operation time" can be divided into "Printing time" and "Non-printing time". The "Printing time" is a time when the printing is actually performed (actual printing time). The "Non-printing time" includes Idle time (time when the machine stands by without any manipulation), Printing preparation time (including a panel manipulation time for image adjustment and job setting, a paper replenishment time, and a time when an operation is performed with a door opened), and Printing interruption time. The "Printing interruption time" includes Paper shortage, Toner shortage, Full paper discharge tray, and Other interruption time (Paper jam (JAM)/Service call (SC), and the like).

In this way, as the basis for the suggestion, first, information that indicates the outline of the operation record (machine operation time, the printing time, the non-printing time) of a target week (for example, last week: the week before the access day) is displayed.

Here, the machine operation time, obtained from the printing time of 104.6 h, the idle time of 164.1 h, the printing preparation time of 12.7 h, and the printing interruption time of 28.6 h, is 310 h, and thus the machine operation rate 1211 is "33.7%". It is indicated in the target apparatus 1213 that the operation log data of four Machines A to D was used for this calculation. The information displayed in the target apparatus 1213 may be any information that can identify the machine, for example, a model name and a serial number of the machine may be used instead of the common name for the machine.

The increase and decrease in production efficiency 1214 indicates the increase and decrease in the machine operation rate from the week before last to last week. Here, an example is shown in which the machine operation rate of last week increases from the machine operation rate of the week before last of "15%" to "33.7%". In the filed showing the machine operation rate of last week, an arrow mark, which indicates that the machine operation rate is improved from the week before last to last week, is displayed. As support for the productivity management manager, a calculation formula of the machine operation rate (operation rate=actual printing time/power-ON time) is displayed.

(Analysis Result Area)

The analysis result area 1220 is an area showing the result obtained by analyzing the classification of the factors of the productivity decrease (for example, Printing interruption time) shown in the analysis classification area 1210. Here, a simple analysis message 1220a, a detailed analysis message 1221, and calculation data 1222 are shown as the analysis result in the analysis result area 1220.

In the simple analysis message 1220a, a topic that simply expresses the analysis result for the classification of the factors of the productivity decrease is displayed. For example, a title or a subheading which the productivity management manager pays attention to and motivates the improvement action is selected. In FIG. 12, a display example of "Improvement effect of 94 minutes is expected (per week)" is shown as the simple analysis message 1220a.

In the detailed analysis message 1221, the details of the analysis result for the classification of the factors of the productivity decrease is displayed. For example, in FIG. 12, a display example of "Paper shortage has stopped the operation for an especially long time of 1466 minutes among interruption factors (Toner shortage, Paper shortage, Full paper discharge tray, and Others)" is displayed as the detailed analysis message 1221.

The calculation data 1222 shows the result obtained by calculating the operation log data related to the classification of the factors of the productivity decrease. The calculation data is an example of processing data obtained by processing a large amount of operation log data by calculation, the calculation data being data obtained by dividing the operation log data into calculation units such as daily units, weekly units, machine units, job units, and all the machines in the factory and calculating the calculation units. The calculation data 1222 includes Period, Toner shortage, Paper shortage, Full paper discharge tray, and other fields. In "Period", examples of "20200920-20200926" (week before last (39th week)) and "20200927-20201003" (last week (40th week)) are shown as calculation periods. For each period, an actual time is shown for Toner shortage, Paper shortage, Full paper discharge tray, and Others. The time of Paper shortage between the week before last and last week is 721+746=1466 h.

(Improvement Recommendation Area)

The improvement recommendation area 1230 is an area showing recommendation for the improvement action (improvement measure). Here, the improvement recommendation area 1230 shows a target of the improvement action and a content 1231 of the improvement action.

In FIG. 12, the graphic symbol 1104, which represents suggestion related to "Machine", is displayed as the target of the improvement action. In the analysis result 1021, since types of suggestion for the improvement actions are "Machine" and "Operation", instead of the graphic symbol 1104 of "Machine", the graphic symbol 1103 of "Operation" or the graphic symbols 1103 and 1104 of "Machine" and "Operation" may be displayed.

As the content 1231 of the improvement action, "By improving the paper shortage in Machine A and Machine B which have a particularly long interruption time, It is possible to decrease the time by 94 minutes/week" is displayed In this way, the details of the analysis and improvement recommendation for the analysis result 1021 are displayed on the detailed screen 1200 of the analysis and improvement recommendation and a detailed screen 1300 of the analysis and improvement recommendation (FIG. 13). The details of the analysis and improvement recommendation for the analysis result are divided into two detailed screens for the analysis and improvement recommendation and displayed since a screen size necessary for display is large. Therefore, a vertical scroll bar is displayed on the right side of the detailed screen 1200 of the analysis and improvement recommendation. By moving a slider 1240 on the scroll bar downward by a dragging manipulation, the display area of the detailed screen 1200 of the analysis and improvement recommendation moves downward. When the display area is moved further downward from the improvement recommendation area 1230, the detailed screen 1300 of the analysis and improvement recommendation of FIG. 13 is displayed. The display area of the detailed screen of the analysis and improvement recommendation can also be moved upward or downward by manipulating a wheel button of the mouse device.

On the detailed screen 1300 of the analysis and improvement recommendation, the suggestion for the specific improvement action and the basis for the suggestion are displayed. The specific improvement action suggests what kind of the operation (for example, paper replenishment at the time of the paper shortage and at the time of idling, or the like) needs to be paid attention to or what kind of the action (for example, periodical confirmation based on the analysis result, or the like) needs to be taken with respect to a specific machine (for example, one of the machines owned by a printing company, such as Machine A, Machine No. 1). The contents of "specific machine", "what kind of operation", and "what kind of action" are variable depending on the operation record of the image forming apparatus 10.

The suggestion for the improvement action includes improvement related to the operation, improvement of a layout of the image forming apparatus, and improvement of an apparatus configuration such as adding options of the image forming apparatus. For example, improvement related to the operation includes manual revision, operator training, increasing a patrol frequency, and a change of settings of the image forming apparatus. The layout of the image forming apparatus includes not only the arrangement of the image forming apparatus but also the installation and layout of a material storage place and a paper shelf. As the option of the image forming apparatus, a large-capacity paper discharge tray or a large-capacity paper feed tray can be used.

The basis for the suggestion is indicated by arranging, in time series, the operation record of the operation related to the improvement action (for example, paper replenishment at the time of the paper shortage and at the time of idling, or the like) of a specific machine (for example, one of the machines owned by a printing company, such as Machine A, Machine No. 1). The time series is arrangement according to the elapsed time in units such as weekly units or daily units. The operation record of the operation of which the productivity is decreasing is compared with the operation record of a standard operation, and the difference therebetween is displayed so as to be understood. For example, it is preferable to express the operation log data having a longer printing interruption time than a weekly average (daily average) by hatching or by using different colors in an easy-to-understand manner.

[Detailed Screen (2) of Analysis and Improvement Recommendation]

FIG. 13 illustrates an example of a detailed screen (2) of the analysis and improvement recommendation. The detailed screen 1300 of the analysis and improvement recommendation illustrated in FIG. 13 is displayed by scrolling down from the detailed screen 1200 of the analysis and improvement recommendation of FIG. 12.

In a similar manner to the detailed screen 1200 of the analysis and improvement recommendation, the detailed screen 1300 of the analysis and improvement recommendation also displays a more detailed analysis result and a more detailed suggestion for the improvement measure with respect to the selected analysis result. The detailed screen 1300 of the analysis and improvement recommendation indicates an example in which an analysis result area 1310, an improvement and recommendation area 1320, and an expected effect area 1330 are provided. The analysis result area 1310 is displayed on the left side of the detailed screen 1300 of the analysis and improvement recommendation, and the improvement and recommendation area 1320 is displayed on the right side of the detailed screen 1300 of the analysis and improvement recommendation. The expected effect area 1330 is displayed below the analysis result area 1310 and the improvement and recommendation area 1320.

The analysis result area 1310 is an area showing a result obtained by analyzing the operation log data related to the improvement action as the basis for the improvement action (improvement measure) shown in the improvement recommendation area 1230. In FIG. 13, two graphs obtained by calculating the operation log data related to the paper shortage are displayed in the analysis result area 1310.

A graph 1311 on the upper side is a graph showing a correlation between the number of papers output from Machines A and B, and the frequency of the paper shortage. Here, Machine A and Machine B have substantially the same specifications. In the graph 1311, a horizontal axis represents the number of output papers and a vertical axis represents the frequency (number of times) of the paper shortage. In a case of looking at the number of output papers and the frequency of the paper shortage in units of 100 sheets, when the number of output papers is 300 to 400, the frequency of the paper shortage is the highest at "41 times".

A graph 1312 on lower side is a graph showing the time until Machine A and Machine B output (print) 300 to 400 sheets and then stops the printing. In the graph 1312, the horizontal axis represents the time taken to output 300 to 400 sheets, and the vertical axis represents the number of jobs stopped due to the paper shortage. The graph 1312 shows the number of jobs stopped due to the paper shortage in five minute units after about 14 minutes have elapsed. This means that there are the largest number of jobs in which the paper runs out at 14 minutes 45 seconds and 19 minutes 39 seconds among a plurality of jobs in which 300 to 400 sheets are output. Roughly speaking, in many jobs in Machines A and B, the paper runs out at a time from 15 minutes to 20 minutes when outputting 300 to 400 sheets.

The improvement and recommendation area 1320 is an area showing the improvement and the recommendation for the analysis result of the analysis result area 1310 shown on the left side. For example, in the analysis result shown in the graph 1311, a message (explanation) that "the frequency of interruption due to the paper shortage after outputting 300 to 400 sheets is the highest" is shown. For example, in the analysis result shown in the graph 1312, the message (explanation) that "it takes more than 15 minutes to output 300 to 400 sheets" is shown.

In the analysis result shown in the graph 1312, a recommendation 1321 is displayed as a specific improvement measure to prevent the paper shortage. In the recommendation 1321, a message that "If job for more than 300 sheets is left, please check the paper feed tray in about 15 minutes" is displayed along with the graphic symbol 1103 of the operation and the graphic symbol 1101 of the improvement action. By displaying the specific improvement measure in this manner, the productivity management manager can promptly take improvement actions.

The expected effect area 1330 is an area showing the expected productivity effect in a case where the improvement measure is implemented. In the expected effect area 1330, it is shown that by implementing the improvement measure for the printing interruption due to the paper shortage when 300 to 400 sheets are output, the interruption time due to the paper shortage in Machine A and Machine B when 300 to 400 sheets are output is "466 minutes". In other words, by implementing the displayed improvement measure, the interruption time "560 minutes" due to the paper shortage in Machine A and Machine B last week is decreased to "466 minutes", and the improvement effect of "94 minutes" per week can be expected.

By manipulating the slider 1240 upward on the detailed screen 1300 of the analysis and improvement recommendation, the detailed screen 1200 of the analysis and improvement recommendation of FIG. 12 is displayed.

Various calculation methods can be considered for the expected effect. For example, the effect obtained by comparing a weekly record of the printing interruption time of a specific machine (weekly average of each of the last week and the week before last) and bringing the record of last week to approach the weekly average based on the comparison result may be regarded as the "expected effect". The weekly record comparison of the printing interruption time of the specific machine and the basis for the expected effect are displayed.

The calculated result (processing data) obtained by calculating the operation log data of one or more image forming apparatuses 10 by using the operation log analysis unit 902, which is illustrated in FIGS. 12 and 13, is stored, as one of the analysis results, in the HDD 504 of the information processing apparatus 40. For example, in FIG. 12, the processing data are the production result graph 1212 by time classification (entire factory) and the calculation data 1222, and in FIG. 13, the processing data are the graphs 1311 and 1312 regarding the number of output papers and the paper shortage.

The operation log analysis unit 902 specifies the processing data related to the basis for the improvement measure described above based on the analysis result of the operation log data, and the analysis result output unit 903 outputs the processing data as the basis for the improvement measure along with the information of the image forming apparatus 10 of which the productivity decreases, the factors, and the improvement measure.

Although an example of the vertical scroll bar is illustrated, the detailed screen of the analysis and improvement recommendation may be displayed horizontally by adopting a horizontal scroll bar. Alternatively, the vertical scroll bar and the horizontal scroll bar may be used together.

[Procedure of Productivity Management processing]

Next, the productivity management processing (operation log data analysis processing) of the information processing apparatus 40 will be described with reference to FIG. 14.

Figure 14:
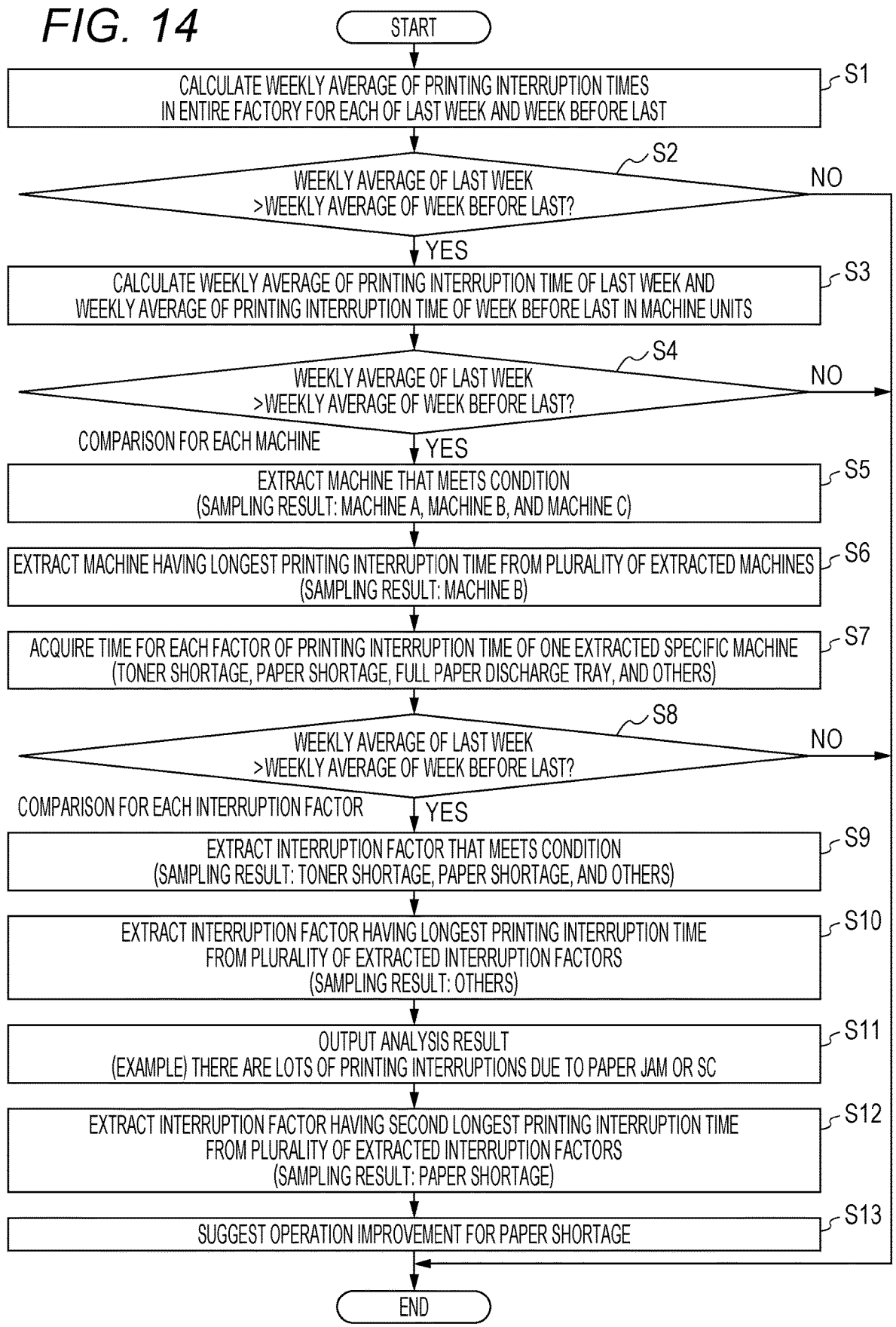
FIG. 14 is a flowchart illustrating a procedure example of productivity management processing of an information processing apparatus according to a first embodiment of the present invention.

FIG. 14 is a flowchart illustrating a procedure example of the productivity management processing of the information processing apparatus 40.

As a premise, the operation log data acquisition unit 901 of the information processing apparatus 40 periodically acquires operation log data from a plurality of the image forming apparatuses 10 (machines) in the entire factory (or the printing company, and the like), and accumulates the operation log data in the HDD 504. Hereinafter, the factors of the productivity decrease will be described as the "printing interruption time", but the factors may be other times. Although a specific example of a sampling result is described in processing steps of FIG. 14, it has nothing to do with the machines and factors illustrated in FIGS. 10 to 13.

In FIG. 14, the operation log analysis unit 902 calculates a weekly average of the printing interruption times of all the machines in the entire factory (printing company) for each of last week and the week before last based on the operation log data accumulated in the HDD 50 (S1).

Generally, in a case where the productivity decreases, the length and content of the printing interruption time are often problems. Therefore, in the present embodiment, the print interruption times are first calculated. However, in a case where the factor of the productivity decrease is the short printing interruption time and long printing preparation time or the short printing time, the factor related to the printing preparation time or printing time is analyzed, and the improvement measure for the factor is presented.

Next, the operation log analysis unit 902 compares the weekly average of the printing interruption time of last week with the weekly average of the printing interruption time of the week before last, and determines whether or not the weekly average of the printing interruption time of last week is greater than the weekly average of the printing interruption time of the week before last (S2). In a case where the weekly average of the printing interruption time of last week is equal to or less than the weekly average of the printing interruption time of the week before last (NO in S2), a series of processing is ended.

Next, in a case where the weekly average of the printing interruption time of last week is greater than the weekly average of the printing interruption time of the week before last (YES in S2), the operation log analysis unit 902 calculates the weekly average of the printing interruption time of last week and the weekly average of the printing interruption time of the week before last in machine units (S3).

Next, the operation log analysis unit 902 determines, for each machine, whether or not the weekly average of the printing interruption time of last week is greater than the weekly average of the printing interruption time of the week before last (S4). The operation log analysis unit 902 performs comparison and determination with respect to all the machines. In a case where there is not a machine in which the weekly average of the printing interruption time of last week is greater than the weekly average of the printing interruption time of the week before last (NO in S4), a series of processing is ended.

Next, in a case where there is a machine in which the weekly average of the printing interruption time of last week is greater than the weekly average of the printing interruption time of the week before last (YES in S4), the operation log analysis unit 902 extracts a machine that meets a condition of Step S4 (S5). For example, "Machine A, Machine B, and Machine C" is obtained as the extraction result of the machine.

Next, the operation log analysis unit 902 extracts a machine having the longest printing interruption time from the extracted machines (S6). For example, "Machine B" is extracted as the machine.

Next, the operation log analysis unit 902 acquires the time for each factor of the printing interruption time of one extracted specific machine (S7). As described above, examples of the factor of the printing interruption time (hereinafter referred to as "interruption factor") include a toner shortage, a paper shortage, and a full paper discharge tray.

Next, the operation log analysis unit 902 determines, for each interruption factor, whether or not the weekly average of the printing interruption time of last week is greater than the weekly average of the printing interruption time of the week before last (S8). The operation log analysis unit 902 performs comparison and determination with respect to all the interruption factors. In a case where there is not an interruption factor in which the weekly average of the printing interruption time of last week is greater than the weekly average of the printing interruption time of the week before last (NO in S8), a series of processing is ended.

Next, in a case where there is an interruption factor in which the weekly average of the printing interruption time of last week is greater than the weekly average of the printing interruption time of the week before last (YES in S8), the operation log analysis unit 902 extracts an interruption factor that meets a condition of Step S8 (S9). For example, "Toner shortage, Paper shortage, and Others" is obtained as the result obtained by extracting the interruption factor.

Next, the operation log analysis unit 902 extracts an interruption factor having the longest printing interruption time from a plurality of the extracted interruption factors (S10). For example, "Others" is extracted as the interruption factor.

Next, the analysis result output unit 903 outputs the analysis result of the interruption factor ("others") extracted by the operation log analysis unit 902 (S11). For example, the analysis result is transmitted from the information processing apparatus 40 to the productivity management terminal 30, and a message that "Printing interruption often occurs due to a paper jam or a service call" is displayed on the display 430 of the productivity management terminal 30. By displaying what kind of trouble the interruption factor for which the cause of such a productivity decrease cannot be specified causes, the productivity management manager can easily grasp the current state of the machine. Accordingly, the productivity management manager can take appropriate actions according to the state of the machine.

Next, the operation log analysis unit 902 extracts an interruption factor having the second longest printing interruption time from a plurality of the interruption factors extracted in Step S9 (S12). For example, "Paper shortage" is extracted as the interruption factor.

Next, the operation log analysis unit 902 suggests an operation improvement for "Paper shortage" (S13), and ends a series of processing.

The operation log analysis unit 902 determines one or more improvement measures for one factor (for example, printing interruption time) that decreases the productivity. For example, in FIG. 10, improvement for the paper shortage, improvement for the full paper discharge tray, and improvement for the number of printed sheets are suggested for the factor "Printing interruption time". In this case, the productivity management manager can easily make flexible decisions depending on the situation, such as starting with the most effective improvement action or starting with the improvement action that is easy to start with the current resources.

The analysis result output unit 903 transmits the analysis result including the suggestion for the operation improvement determined by the operation log analysis unit 902 to the productivity management terminal 30 by using the network I/F 506. The productivity management terminal 30 displays the analysis result received from the information processing apparatus 40 on the display 430 by using the productivity management application 800.

In this way, the operation log analysis unit 902 performs processing of determining the improvement measure for an element that decreases the productivity (interruption factor: for example, others) the most among elements contributing to the factor that decreases the productivity of the image forming apparatus 10 (for example, printing interruption time). In a case where the operation log analysis unit 902 cannot determine the improvement measure for the element, the operation log analysis unit 902 performs processing of determining the improvement measure for the element (for example, paper shortage) that decreases the productivity the second most. Accordingly, the information processing apparatus 40 can suggest an effective improvement measure for the factor that decreases the productivity.

That is, the operation log analysis unit 902 performs processing of determining the improvement measure for each element (for example, toner shortage, paper shortage, full paper discharge tray, and others) contributing to the factor that decreases the productivity of the image forming apparatus 10 (for example, printing interruption time), and determines the improvement measures for the element in orders of the elements that decrease the productivity of the image forming apparatus 10 with respect to the factor described above. Accordingly, the information processing apparatus 40 can suggest the improvement measure for the factor that decreases the productivity in order of highly effective improvement measure.

In FIG. 14, the interruption factor having the second longest printing interruption time is analyzed, but the interruption factor having the printing interruption time with the third and subsequent lengths may be analyzed. In the flowchart illustrated in FIG. 14, a plurality of processing may be executed in parallel or a processing order may be changed as long as the processing results are not affected. For example, the processing order of Steps S10 and S11, and Steps S12 and S13 may be reversed.

As described above, the information processing apparatus 40 according to the first embodiment is an information processing apparatus that manages productivity by processing information obtained from one or more image forming apparatuses 10. The information processing apparatus 40 includes an acquisition unit (operation log data acquisition unit 901) that acquires operation history information (operation log data) from the image forming apparatus 10, an analysis unit (operation log analysis unit 902) that analyzes the operation history information and determines an improvement measure (improvement action) for improving productivity based on the analysis result, and an output unit (analysis result output unit 903) that outputs the improvement measure.

In the information processing apparatus 40 according to the present embodiment configured as described above, the factor that decreases the productivity is specified from the operation log data of the image forming apparatus 10, and a specific improvement measure (improvement action) for improving the productivity is output. By displaying the specific improvement measure on a display screen of the productivity management terminal 30, the productivity management manager can promptly take an improvement action, and the productivity of the image forming apparatus 10 can be improved.

In the information processing apparatus 40 according to the present embodiment, the analysis unit (operation log analysis unit 902) calculates the effect obtained by implementing the improvement measure, and the output unit (analysis result output unit 903) outputs the effect along with the improvement measure.

According to the information processing apparatus 40 having the above configuration, by outputting the improvement measure and the effect of the improvement measure, the productivity management manager is highly motivated for the improvement action and can easily take the improvement action.

Second Embodiment

The second embodiment is an example of outputting an expected effect in a case where an improvement action is implemented first and creating an opportunity to confirm the details of the improvement action. As an analysis result, the information processing apparatus 40 transmits an analysis and improvement recommendation including the expected effect to the productivity management terminal 30. The productivity management terminal 30 displays a screen of the analysis and improvement recommendation including the expected effect in the display 430.

[Screen of Analysis and Improvement Recommendation]

The screen of the analysis and improvement recommendation according to the second embodiment will be described with reference to FIG. 15.

Figure 15:
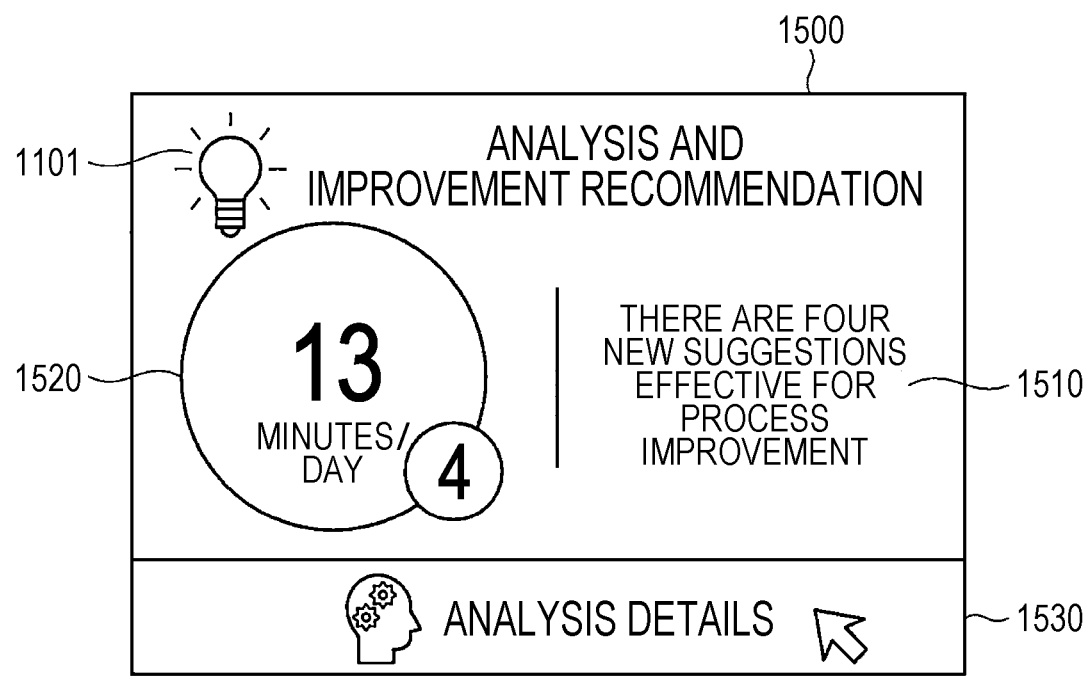
FIG. 15 is a diagram illustrating an example of a screen of an analysis and improvement recommendation according to a second embodiment of the present invention.

FIG. 15 illustrates an example of the screen of the analysis and improvement recommendation.

On a screen 1500 of the analysis and improvement recommendation illustrated in FIG. 15, a notification outline 1510, an expected effect 1520, and an analysis detail button 1530 are displayed.

The notification outline 1510 shows a notification outline regarding the analysis and improvement recommendation. As the notification outline, it is notified that there is a new suggestion effective for process improvement mainly based on the analysis result of the operation log data. In the example of FIG. 15, a message that "There are four new suggestions effective for the process improvement" is shown. The new suggestion includes "analysis and discovery" in addition to the "improvement action".

The expected effect 1520 is an icon indicating that the effect obtained by implementing the improvement action is the greatest (for example, 13 minutes/day). Batch information on a lower right side of the expected effect 1520 shows the number of suggestions (for example, four) based on the operation log data. The number of suggestions corresponds to the number of analysis results described in the analysis result report of FIG. 16 to be described later.

In this way, after the productivity management manager logs into the productivity management application, by displaying the screen 1500 of the analysis and improvement recommendation first, the effect that attracts interest of the productivity management manager can be expected. For example, by showing the greatest expected effect, the productivity management manager becomes interested thinking that "what kind of suggestion can make improvement this much?". By creating an opportunity for the productivity management manager to confirm the details of the improvement action in this manner, the behavior of the productivity management manager is guided.

The analysis detail button 1530 is an icon having a button function for transitioning to a screen displaying the details of the analysis result. By placing a pointer (white arrow) to the analysis detail button 1530 and then clicking a mouse device, a screen showing a list of improvement suggestions is displayed as the analysis result as shown in FIG. 16.

[Screen showing Analysis Result of Last Week]

FIG. 16 is a diagram illustrating an example of a screen displaying the analysis result of last week according to the second embodiment.

An analysis result report 1610 is displayed on a screen 1600 showing the analysis result of last week. In FIG. 16, the analysis result report 1610 shows a list of four analysis results (suggestions). Each analysis result (record) includes fields of Suggestion, Suggestion Type, Analysis Classification, Expected Effect, and Suggestion Outline as in FIG. 10. Here, the outline of the improvement action and the effect obtained in a case where the improvement action is implemented can be confirmed.

In FIG. 16, in an analysis result 1611 of the first line of the analysis result report 1610, an analysis result 1611 corresponding to Expected Effect of "13 minutes/day" which is displayed on the screen 1500 of the analysis and improvement recommendation is displayed. In the analysis result 1611, the graphic symbol 1101 is set for "Suggestion", the graphic symbols 1103 and 1104 are set for "Suggestion Type", the graphic symbol 1107 is set for "Analysis Classification", and 13 minutes/day is set for "Expected Effect". A message that "There is an operation improvement suggestion regarding the printing interruption time of Machine A" is displayed in "Suggestion Outline". Here, when the analysis result 1611 is clicked, a more detailed analysis result for the selected analysis result 1611, for example, a detailed screen of the analysis and improvement recommendation as shown in FIG. 12 is displayed.

In this way, in the second embodiment, an outline of the improvement suggestion and an estimated value of the effect obtained by the improvement (for example, 13 minutes/day) are displayed. This motivates the productivity management manager who obtains the expected effect. The productivity management manager would think "If such an effect can be obtained, why don't we make that improvement" and look at the details of the improvement action.

In the first embodiment described above, the improvement measure that makes the effect in weekly units is suggested, and the calculation data in weekly units is displayed as the basis for the suggestion. However, it is desirable that calculation units of the basis (calculation data) to be displayed according to the suggested improvement measure are changed That is, in the case of displaying the effect in daily units as illustrated in FIGS. 15 and 16 in the second embodiment, the calculation data in daily units is displayed as the basis when the analysis result 1611 is selected.

Modified Example

It should be noted that the present invention is not limited to the above-described embodiments, and it goes without saying that various other application examples and modifications can be taken as long as it does not deviate from the gist of the present invention described in the claims. For example, each of the above-described embodiments describes the configuration of the information processing apparatus and the productivity management system in detail and specifically in order to explain the present invention in an easy-to-understand manner, and does not necessarily include all the constituent elements described above It is possible to replace a part of the configuration of certain embodiment with a constituent element of another embodiment. It is possible to add a constituent element of another embodiment to a configuration of certain embodiment. It is also possible to add, replace, or delete other constituent elements with respect to a part of the configuration of each embodiment.

For example, in the first and second embodiments described above, the configuration in which the information processing apparatus 40 collects and analyzes the operation log data of a plurality of the image forming apparatuses 10 and performs suggestion for the improvement measure has been described, but the productivity management terminal 30 may have a function of the information processing apparatus 40. In this case, it is not necessary to output the operation log data of the image forming apparatus 10 to the network 60 which is a wide area network.

Each of the above configurations, functions, processing units and the like may be realized as hardware, for example, by designing a part or all of them as an integrated circuit. As the hardware, a processor device in a broad sense such as a field programmable gate array (FPGA) or an application specific integrated circuit (ASIC) may be used.

Each constituent element of the information processing apparatus according to each of the above-described embodiments may be installed in any hardware as long as the hardware can transmit and receive information to and from each other via the network. The processing performed by a certain processing unit may be realized by one hardware, or may be realized by distributed processing using a plurality of the hardware.

Although embodiments of the present invention have been described and illustrated in detail, the disclosed embodiments are made for purposes of illustration and example only and not limitation. The scope of the present invention should be interpreted by terms of the appended claims

What is claimed is:

1. An information processing apparatus that manages productivity by processing information obtained from one or more image forming apparatuses, the information processing apparatus comprising:
a hardware processor that:
acquires operation history information from the image forming apparatus;
analyzes the operation history information, and determines an improvement measure for decreasing a non-printing time in an operation time of the image forming apparatus based on an analysis result of the operation history information on the non-printing time, the non-printing time being a time when the image forming apparatus does not perform printing;
specifies, based on the analysis result, an image forming apparatus of which productivity decreases as compared with a reference value among one or more image forming apparatus;
specifies, based on the analysis result, a factor that decreases the productivity of the image forming apparatus;
performs processing of determining an improvement measure for an element that decreases the productivity most among the elements contributing to the factor that decreases the productivity of the image forming apparatus;
performs, in a case where the hardware processor is not capable of determining the improvement measure for the element, processing of determining the improvement measure for the element that decreases the productivity second most; and
outputs the improvement measure.

2. The information processing apparatus according to claim 1, wherein the hardware processor calculates an effect obtained by implementing the improvement measure, and the hardware processor outputs the effect together with the improvement measure.

3. The information processing apparatus according to claim 1, wherein
based on the analysis result, the hardware processor determines the improvement measure for the factor that decreases the productivity of the image forming apparatus.

4. The information processing apparatus according to claim 3, wherein
the hardware processor specifies a basis for the determined improvement measure based on the analysis result, and
the hardware processor outputs the basis for the improvement measure together with information regarding the specified image forming apparatus, the factor, and the improvement measure.

5. The information processing apparatus according to claim 4, further comprising a storage that stores, as the analysis result, processing data obtained by calculating the operation history information of one or more image forming apparatuses by using the hardware processor, wherein
based on the analysis result, the hardware processor specifies the processing data related to the basis for the improvement measure, and
the hardware processor outputs the processing data as the basis for the improvement measure together with information regarding the image forming apparatus of which the productivity decreases, the factor, and the improvement measure.

6. The information processing apparatus according to claim 1,
wherein the hardware processor determines a plurality of the improvement measures for one factor.

7. The information processing apparatus according to claim 1, wherein one or more image forming apparatuses are managed separately for different customers.

8. A productivity management method using an information processing apparatus that manages productivity by processing information obtained from one or more image forming apparatuses, the productivity management method comprising:
causing a hardware processor of the information processing apparatus to acquire operation history information from the image forming apparatus,
causing the hardware processor of the information processing apparatus to analyze the operation history information, and determine an improvement measure for decreasing a non-printing time in an operation time of the image forming apparatus based on an analysis result of the operation history information on the non-printing time, the non-printing time being a time when the image forming apparatus does not perform printing,
causing the hardware processor of the information processing apparatus to specify, based on the analysis result, an image forming apparatus of which productivity decreases as compared with a reference value among one or more image forming apparatus;
causing the hardware processor of the information processing apparatus to specify, based on the analysis result, a factor that decreases the productivity of the image forming apparatus;
causing the hardware processor of the information processing apparatus to perform processing of determining an improvement measure for an element that decreases the productivity most among the elements contributing to the factor that decreases the productivity of the image forming apparatus;
causing the hardware processor of the information processing apparatus to perform, in a case where the hardware processor is not capable of determining the improvement measure for the element, processing of determining the improvement measure for the element that decreases the productivity second most; and
causing the hardware processor of the information processing apparatus to output the improvement measure.

9. A non-transitory recording medium storing a computer readable program causing a computer that manages productivity by processing information obtained from one or more image forming apparatuses to execute processing, the processing comprising:
acquiring operation history information from the image forming apparatus,
analyzing the operation history information, and determining an improvement measure for decreasing a non-printing time in an operation time of the image forming apparatus based on an analysis result of the operation history information on the non-printing time, the non-printing time being a time when the image forming apparatus does not perform printing,
specifying, based on the analysis result, an image forming apparatus of which productivity decreases as compared with a reference value among one or more image forming apparatus;
specifying, based on the analysis result, a factor that decreases the productivity of the image forming apparatus;
performing processing of determining an improvement measure for an element that decreases the productivity most among the elements contributing to the factor that decreases the productivity of the image forming apparatus;
performing, in a case where the hardware processor is not capable of determining the improvement measure for the element, processing of determining the improvement measure for the element that decreases the productivity second most; and
outputting the improvement measure.

10. The information processing apparatus according to claim 1, wherein
the hardware processor calculates, based on the operation history information, a machine operation rate of the image forming apparatus, the machine operation rate is a ratio of an actual printing time of the image forming apparatus to a power-on time of the image forming apparatus, and
the improvement measure includes a measure for increasing the machine operation rate of the image forming apparatus.

11. The information processing apparatus according to claim 1, wherein
the hardware processor calculates, based on the operation history information, a printing interruption time of the image forming apparatus, the printing interruption time being due to at least one of factors including a toner shortage, a paper shortage, and a full paper discharge tray, and
the improvement measure includes a measure for decreasing the printing interruption time of the image forming apparatus.

12. An information processing apparatus that manages productivity by processing information obtained from one or more image forming apparatuses, the information processing apparatus comprising:
a hardware processor that:
acquires operation history information from the image forming apparatus;
analyzes the operation history information and determines an improvement measure for improving the productivity based on an analysis result;
calculates an effect obtained by implementing the improvement measure; and
outputs the improvement measure together with the effect, wherein
the analyzing the operation history information and determining the improvement measure based on the analysis result includes:
based on the analysis result, specifying an image forming apparatus of which productivity decreases as compared with a reference value among one or more image forming apparatus;
based on the analysis result, specifying a factor that decreases the productivity of the image forming apparatus; and
performing processing of determining the improvement measure for an element that decreases the productivity most among the elements contributing to the factor that decreases the productivity of the image forming apparatus, wherein
in a case where the hardware processor is not capable of determining the improvement measure for the element, performs processing of determining the improvement measure for the element that decreases the productivity second most.

13. The information processing apparatus according to claim 1, wherein the non-printing time includes at least one of a printing interrupting time, a printing preparation time, and an idle time.

14. The productivity management method according to claim 8, wherein the non-printing time includes at least one of a printing interrupting time, a printing preparation time, and an idle time.

15. The non-transitory recording medium according to claim 9, wherein the non-printing time includes at least one of a printing interrupting time, a printing preparation time, and an idle time.

* * * * *